United States Patent
Yalamanchi (10) Patent No.: US 7,590,650 B2
(45) Date of Patent: Sep. 15, 2009

(54) DETERMINING INTEREST IN AN XML DOCUMENT

(75) Inventor: Aravind Yalamanchi, Nashua, NH (US)

(73) Assignee: Oracle International Corporation, Redwood Shores, CA (US)

( * ) Notice: Subject to any disclaimer, the term of this patent is extended or adjusted under 35 U.S.C. 154(b) by 296 days.

(21) Appl. No.: 11/441,622

(22) Filed: May 26, 2006

(65) Prior Publication Data
US 2006/0218194 A1   Sep. 28, 2006

Related U.S. Application Data (60) Division of application No. 10/365,771, filed on Feb. 12, 2003, now Pat. No. 7,107,282, which is a continuation-in-part of application No. 10/254,383, filed on Sep. 24, 2002, now Pat. No. 7,127,467.

(60) Provisional application No. 60/378,018, filed on May 10, 2002.

(51) Int. Cl.
*G06F 17/30* (2006.01)
(52) U.S. Cl. .................................... 707/102
(58) Field of Classification Search ................ 707/3, 707/4, 5, 6, 7, 102; 715/234, 237, 238, 239
See application file for complete search history.

(56) References Cited

U.S. PATENT DOCUMENTS

| | | | |
|---|---|---|---|
| 4,815,030 A | 3/1989 | Cross et al. | |
| 5,072,405 A | 12/1991 | Ramakrishna et al. | |
| 5,446,885 A | 8/1995 | Moore et al. | |
| 5,627,764 A | 5/1997 | Schutzman et al. | |
| 5,680,602 A | 10/1997 | Bloem et al. | |
| 5,802,253 A | 9/1998 | Gross et al. | |
| 5,852,818 A | 12/1998 | Guay et al. | |
| 5,870,552 A | 2/1999 | Dozier et al. | |
| 5,870,747 A | 2/1999 | Sundaresan | |
| 5,873,075 A | 2/1999 | Cochrane et al. | |
| 5,873,084 A | 2/1999 | Bracho et al. | |

(Continued)

FOREIGN PATENT DOCUMENTS

EP   0743596 A2   11/1996

(Continued)

OTHER PUBLICATIONS

International Searching Authority, "Notification of Transmittal of the International Search Report and the Written Opinion of the International Searching Authority, or the Declaration," PCT/US2005/009598, dated Nov. 29, 2005, 18 pages.

(Continued)

*Primary Examiner*—Diane Mizrahi
(74) *Attorney, Agent, or Firm*—Hickman Palermo Truong & Becker LLP (57) ABSTRACT

First data that represents a level associated with an element within an expression, such as an XPath expression, is generated from the expression, and stored in one or more columns of a table. Second data that represents a condition on an attribute of the element is generated from the expression, and stored in one or more columns of the same or a different table. A plurality of expressions can be processed as such, and a determination made whether any of the expressions match with a given hierarchical data item, such as an XML document, that includes a value that corresponds to an attribute that is associated with an element that resides at a particular level within the data item. Such determination is made based on whether the particular level matches the first data and the value satisfies the second data associated with a given expression.

23 Claims, 4 Drawing Sheets

U.S. PATENT DOCUMENTS

| | | | |
|---|---|---|---|
| 5,940,839 A | 8/1999 | Chen et al. | |
| 5,970,244 A | 10/1999 | Nagahashi et al. | |
| 5,984,786 A | 11/1999 | Ehrman | |
| 6,021,443 A | 2/2000 | Bracho et al. | |
| 6,023,571 A | 2/2000 | Matsumoto et al. | |
| 6,038,601 A | 3/2000 | Lambert et al. | |
| 6,067,540 A | 5/2000 | Ozbutun et al. | |
| 6,073,129 A | 6/2000 | Levine et al. | |
| 6,122,639 A | 9/2000 | Babu et al. | |
| 6,185,555 B1 | 2/2001 | Sprenger et al. | |
| 6,233,537 B1 | 5/2001 | Gryphon et al. | |
| 6,285,997 B1 | 9/2001 | Carey et al. | |
| 6,401,090 B1 | 6/2002 | Bailis et al. | |
| 6,405,191 B1 | 6/2002 | Bhatt et al. | |
| 6,427,146 B1 | 7/2002 | Chu | |
| 6,490,574 B1 | 12/2002 | Bennett et al. | |
| 6,493,701 B2 | 12/2002 | Ponnekanti | |
| 6,502,093 B1 | 12/2002 | Bhatt et al. | |
| 6,604,093 B1 | 8/2003 | Etzion et al. | |
| 6,604,100 B1 | 8/2003 | Fernandez et al. | |
| 6,681,383 B1 | 1/2004 | Pastor et al. | |
| 6,757,710 B2 | 6/2004 | Reed | |
| 6,801,915 B1 | 10/2004 | Mack | |
| 6,850,893 B2 | 2/2005 | Lipkin et al. | |
| 6,901,410 B2 * | 5/2005 | Marron et al. | 707/104.1 |
| 6,917,946 B2 | 7/2005 | Corl, Jr. et al. | |
| 6,918,107 B2 * | 7/2005 | Lucas et al. | 717/124 |
| 7,089,228 B2 | 8/2006 | Arnold et al. | |
| 7,127,467 B2 * | 10/2006 | Yalamanchi et al. | 707/102 |
| 7,149,738 B2 | 12/2006 | Kumar et al. | |
| 7,289,988 B2 | 10/2007 | Joseph | |
| 2002/0062475 A1 | 5/2002 | Iborra et al. | |
| 2002/0069157 A1 * | 6/2002 | Jordan | 705/37 |
| 2002/0073019 A1 | 6/2002 | Deaton | |
| 2002/0078015 A1 | 6/2002 | Ponnekanti | |
| 2002/0116457 A1 | 8/2002 | Eshleman et al. | |
| 2002/0138582 A1 | 9/2002 | Chandra et al. | |
| 2002/0152149 A1 | 10/2002 | Tanaka et al. | |
| 2003/0046421 A1 | 3/2003 | Horvitz et al. | |
| 2003/0120642 A1 | 6/2003 | Egilsson et al. | |
| 2003/0212657 A1 | 11/2003 | Kaluskar et al. | |
| 2003/0212670 A1 | 11/2003 | Yalamanchi et al. | |
| 2004/0117407 A1 | 6/2004 | Kumar et al. | |
| 2004/0181543 A1 | 9/2004 | Wu et al. | |
| 2004/0193575 A1 | 9/2004 | Chen et al. | |
| 2005/0010545 A1 | 1/2005 | Joseph | |
| 2005/0125371 A1 | 6/2005 | Bhide et al. | |
| 2005/0203940 A1 | 9/2005 | Farrar et al. | |
| 2005/0222978 A1 | 10/2005 | Drory et al. | |
| 2005/0222996 A1 | 10/2005 | Yalamanchi | |

FOREIGN PATENT DOCUMENTS

| | | |
|---|---|---|
| EP | 0 959 416 A2 | 11/1999 |
| GB | 2274182 A | 7/1994 |
| GB | 2354847 A | 4/2001 |
| GB | 2354848 A | 4/2001 |
| JP | 5089143 | 4/1993 |
| JP | 6319024 | 11/1994 |
| WO | WO 98/33131 A1 | 7/1998 |
| WO | WO 01/08048 A | 2/2001 |
| WO | WO 01/88795 A1 | 11/2001 |
| WO | WO 03098479 A | 5/2003 |

OTHER PUBLICATIONS

Paton, Norman W. et al., "Active Database Systems," ACM Computing Surveys, vol. 31, No. 1, Mar. 1999, XP002354519, pp. 63-103.
Segev, A. et al., "Rule Activation Techniques in Active Database Systems", Journal of Intelligent Information Systems, 7(2):173-194, Oct. 1996, 23 pages.
Greco, Gianluigi et al., Event choice datalog: a logic programming language for reasoning in multiple dimensions, 2004, ACM Press, pp. 238-249.
Forgy, Charles L., "Rete: A Fast Algorithm for the Many Pattern/Many Object Pattern Match Problem," Artificial Intelligence, 1982, pp. 17-37.
Aguilera, Marcos K., et al., "Matching Events in a Content-based Subscription System," 1999, Symposium on Principles of Distributed Computing, 9 pages.
Dayal, Umeshwar, et al., "Active Database Systems," *Modern Database Systems: The Object Model, Interoperability, and Beyond*, Addison-Wesley, Reading, Massachusetts, Sep. 1994, 25 pages.
Srinivasan, Jagannathan, et al., "Extensible Indexing: A Framework For Integrating Domain-Specific Indexing Schemes Into Oracle8$i$," Oracle Corporation, 16$^{th}$ International Conference on Data Engineering, Feb. 28-Mar. 3, 2000, San Diego, California, 10 pages.
O'Neill, Patrick, et al., "Improved Query Performance with Variant Indexes," SIGMOD '97 May 1997, Tucson, Arizona, USA, pp. 1-12.
Hanson, Eric N., et al., "Optimized Rule Condition Testing in Ariel using Gator Networks," Oct. 23, 1995, University of Florida, TR-95-027, pp. 1-24.
International Searching Authority, "Notification of Transmittal of the International Search Report or the Declaration," Feb. 12, 2004, 9 pages.
IBM Corp., "Improved Rete Algorithm—Hashing Techniques Applied to Partial Match Memories," IBM Technical Disclosure Bulletin, vol. 35, No. 3, Aug. 1992, p. 149.
Wyle, M.F., "A Wide Area Network Information Filter," Proceedings International Conference on Artificial Intelligence Applications on Wall Street, Oct. 9, 1991, New York, US, Los Alamitos, CA Oct. 9, 1991, XP000534152, pp. 10-15.
Binkley, Jim, et al: "Rama: An Architecture for Internet Information Filtering," Journal of Intelligent Information Systems, vol. 5, No. 2, Sep. 1, 1995, XP000617268, pp. 81-99.
ODonnell, Patrick A., et al., "Deadlock-Free and Collision-Free Coordination of Two Robot Manipulators," 1989, IEEE, XP 000041489, pp. 484-489.
Krishnaprasad, Muralidhar et al., "Query Rewrite for XML in Oracle XML DB," Proceedings of the 30th VLDB Conference-2004, pp. 1134-1145.
Chamberlain, Don, "Query Languages and XML," IBM Almaden Research Center, Dec. 2000, http://www-db.sc.wisc.edu, pp.1-26.
Clark, James, "XML Path Language (Xpath)-Version 1.0," W3C, Nov. 16, 1999, http://www.w3.org.TR/xpath.html, pp. 1-37.
Bea, "Using Expressions and Conditions," WebLogic Process Integrator Release 1.1, 2000, http://www.3-docs.bea.com, pp. 1-12.
www.cs.uku.fi/kilpelai/RDK01/lectures/Xquery.pdf, 2001, pp. 1-10.
Current Claims, PCT/US2005/009598, Jan. 27, 2006, 5 pages.
Grosof, Benjamin N. et al., "SweetDeal: Representing Agent Contracts with Exceptions using XML Rules. Ontologies, and Process Descriptions," ACM, XP-002354520, May 2003, 10 pages.
Nippl, Clara, et al., "Accelerating Profiling Services by Parallel Database Technology," 1997, 9 pages. (copy of Internet citation with article date submitted).
Chamberlain, Don et al., "Xquery: A Query language for XML," W3C, retrieved from internet: http://www.w3.org/TR/2001/WD-xquery-20010215, IBM Almaden Research Center, Feb. 2001, 56 pages.

* cited by examiner

DETERMINING INTEREST IN AN XML DOCUMENT

CROSS REFERENCE TO RELATED APPLICATIONS

This application is a divisional of and claims the benefit of priority from U.S. patent application Ser. No. 10/365,771 entitled "Managing XPath Expressions in a Database System" filed on Feb. 12, 2003 now U.S. Pat. No. 7,107,282, which is a continuation-in-part of and claims the benefit of priority to U.S. patent application Ser. No. 10/254,383 entitled "Managing Expressions In A Database System" filed on Sep. 24, 2002 now U.S. Pat. No. 7,127,467, both of which claim the benefit of priority from U.S. Provisional Patent Application Ser. No. 60/378,018 entitled "Managing Expressions In A Database System" filed on May 10, 2002; the entire content of all of which are incorporated by reference in their entirety for all purposes as if fully disclosed herein.

FIELD OF THE INVENTION

The present invention relates generally to database management systems and, more specifically, to techniques for managing conditional expressions in database systems.

BACKGROUND OF THE INVENTION

Filtering Expression Sets

In the context of event and content-based subscription systems, events are defined which, when met, trigger an action. For example, a subscriber can define rules in the form of expressions that specify a state of content that, when met, trigger transmission of content to the subscriber. Using a database management system as an underlying engine for an event-based subscription system, a subscriber can register queries with the system that represent conditional expressions on the content of the events. Generally in this context, an event refers to some quantifiable set of information and the expressions are related to the content of such document. In such a subscription or similarly functioning system, a potentially very large set of queries, i.e., an expression set on the content, are registered to manage the publication of desired content data. When a given data item becomes available, these conditional expressions are filtered to find those expressions that match the given data item. The data for which the expressions are filtered could be, for example, a set of name-value pairs, an XML (Extensible Markup Language) document, or a combination of both.

A simple but inefficient approach to the task of filtering expression sets is to test all of the expressions in a given set for each data item. However, this approach is scalable neither for a large set of expressions nor for a high rate of events. Therefore, most commercial systems pre-process the expression set and create in-memory matching networks (i.e., specialized data structures) that group matching predicates in the expression set and share the processing cost across multiple expressions.

Matching networks rely on the fact that a conditional expression on scalar data can be decomposed into independent predicates and a decision tree can be constructed by assigning each predicate to a node in the tree. Thus, matching networks are decision trees in which each node represents a predicate group in a given expression set. Data flows from a parent node to its children only if the data evaluates to true for the predicate representing the parent node. A path from the root of the decision tree to a leaf node represents all the conjunctions in an expression. The leaf nodes in the tree are labeled with expression identifiers and if a data item passes the predicate test on a leaf node, the corresponding expressions are considered true for that data item. Many variants of the matching networks (like RETE, TREAT and Gator networks) are in use for existing systems.

In existing systems, any operation requiring filtering of expressions and related information requires significant custom coding and reduces performance characteristics. Furthermore, the number of expressions is limited in size as the corresponding matching networks must fit in main-memory, changes in expressions are costly, and users are unable to adjust filtering strategies to the structure and use of the expressions and related data.

XPath Expressions

XPath is a language for addressing XML documents. XPath also provides basic facilities for manipulation of strings, numbers and booleans. XPath uses a compact, non-XML syntax to facilitate use of XPath within URIs and XML attribute values. XPath operates on the abstract, logical structure of an XML document, rather than its surface syntax. XPath gets its name from its use of a path notation as in URLs for navigating through the hierarchical structure of an XML document.

XPath models an XML document as a tree of nodes. There are different types of nodes, including element nodes, attribute nodes and text nodes. The XPath data model is described in detail in Section 5 ("Data Model") of "XML Path Language (XPath)" (version 1.0), a W3C (World Wide Web Consortium) Recommendation dated 16 Nov. 1999.

The primary syntactic construct in XPath is the expression, which is evaluated to yield an object. XPath expressions are described in Section 3 ("Expressions") of "XML Path Language (XPath)" (version 1.0). One important kind of expression is a location path. A location path selects a set of nodes relative to a context node. The result of evaluating an expression that is a location path is the node-set containing the nodes selected by the location path. Location paths can recursively contain expressions that are used to filter sets of nodes. The semantics of location paths are described in Section 2 ("Location Paths") of "XML Path Language (XPath)" (version 1.0).

In the case of content-based subscription systems, the techniques used for constructing decision trees for expressions on non-XML data are not accurately applicable to XPath expressions defined on XML data. In the absence of an efficient evaluation engine, each XPath expression has to be tested on each XML data item separately to determine whether it evaluates to true or not. However, this approach also is not scalable for a large set of expressions or for a high rate of events.

One approach to grouping a large set of XPath expressions defined for expected XML data and for sharing the evaluation costs across multiple expressions is described in "Efficient Filtering of XML Documents for Selective Dissemination of Information" (Mehmet Altinel and Michael J. Franklin; Proceedings of the 26$^{th}$ VLDB Conference, Cairo, Egypt, 2000), in which in-memory finite state machines are built for each XPath expression.

To build such a finite state machine, each XPath expression is decomposed into a set of path nodes that correspond to elements in an XML document, which serve as states in the state machine. The state information also includes the relative and/or absolute level of the path node (element) within the XML document. A hash index is built on a set of states corresponding to multiple XPath expressions using the element name as the hash key. For each hash key, the states are maintained as one or more linked lists. In order to match an XML document for a set of XPath expressions, a document parser looks up the element name in the hash index every time a new element is encountered and a list of corresponding nodes are checked for a match with respect to the level of the element. For each node that succeeds the check, the next node in the corresponding state machine is activated. If the node that succeeded the check is a last node in a state machine for an XPath expression, then the expression is considered a match for the XML document.

The evaluation techniques used in the preceding approach rely on the level of the elements in the XML document and not on any predicates on the attributes in the elements. Therefore, any predicates on one or more attributes of an element are checked linearly when the node for the corresponding element is active in the state machine. Hence, for a large set of XPath expressions that differ from each other only in the predicate on the attribute, this approach is equivalent to evaluating each XPath expression on the XML document linearly. For example, two XPath expressions, /PUBLICATION/AUTHOR[@name="SCOTT"] and /PUBLICATION/AUTHOR[@name="ANDY"], are grouped only based on <publication> and <author> elements and the predicate on the 'name' attribute is checked linearly for both the expressions.

Due to the extensive use of main memory and many data movement operations during evaluation, this technique may not scale well. Also, the existence of element node filters that contain path expressions, i.e., an XPath expression nested within an attribute predicate of an XPath expression, further complicates the prior evaluation process.

Based on the foregoing, it is clearly desirable to provide an improved mechanism for managing expressions, such as XPath expressions, in a database system. In addition, there is a need for a mechanism that provides the ability to filter XPath expressions in conjunction with predicates on non-XML data.

BRIEF DESCRIPTION OF THE DRAWINGS

The present invention is illustrated by way of example, and not by way of limitation, in the figures of the accompanying drawings and in which like reference numerals refer to similar elements and in which.

DETAILED DESCRIPTION OF EMBODIMENTS OF THE INVENTION

A method and system are described for managing expressions in a database system. In addition, and more specifically, methods and systems are described for managing XPath expressions in a database system.

In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

Overview

Conditional expressions on hierarchically structured information are often presented in a path format in which an element of interest within the information is identified, and a value of interest associated with an attribute of the element is identified. Such expressions can be applied to the hierarchical information to determine whether matches between the expressions and the information exist. For example, XPath expressions can be used to establish conditional predicates in relation to an XML document.

According to one embodiment, a specialized filter is built on a set of expressions, which are stored in a data table. The specialized filter is used to filter the relatively large set of expressions to identify particular expressions that are relevant to a given data item. Further, such a filter is used as an index into another table that associates expressions with owners or users of such expressions, thus identifying owners of expressions that match a given data item so that the data item can be served to interested owners.

In an embodiment, first data that represents a level associated with an element within an expression is generated from the expression, and stored in one or more columns of a table. Second data that represents a condition on an attribute of the element is generated from the expression, and stored in one or more columns of the same or a different table. If the first and second data are stored in the same table, then according to an embodiment, a bitmap index is generated for the columns storing the first and second data. A plurality of expressions can be processed in this manner. A determination is made whether any of the expressions match with a given hierarchical data item that includes a value that corresponds to an attribute that is associated with an element that resides at a particular level within the data item. Such determination is made based on whether the particular level matches the first data and the value satisfies the second data associated with a given expression. Determination of a match between the particular level and the first data can occur upon the particular level having a particular logical relationship to the level represented by the first data, such as being greater than or equal to (i.e., $\geq$) the level represented by the first data.

Managing Expressions in a Database System

Typically, in event and content-based subscription systems, a set of expressions or rules (e.g., Event-Condition-Action (ECA) rules) is defined for an event structure or context, and the structure of the event determines the elementary attributes that can be used in the expressions. The term "event" is used in this context to refer to the data item for which expressions, or "conditions", are evaluated. For example, an event, in the context of stock trading, might be a publicly-traded stock attaining a particular price, which is represented as a data item. Thus, elementary attributes of expressions associated with such an event could include, for example, SYMBOL, PRICE, and CHANGE. For another example, an event might be information embodied in a hierarchical data item, such as an XML document, or the arrival of such a data item. An ECA rule lies dormant until it is triggered by the occurrence of an Event.

A set of expressions defined for an event structure or context is called an expression set. For example, Subscriber A may be interested in an event expressed as SYMBOL=ORCL, PRICE>30, and CHANGE>5; Subscriber B may be interested in an event expressed as SYMBOL=CSCO, and PRICE>25; and Subscriber C may be interested in an event expressed as SYMBOL=INTC, and CHANGE/PRICE>0.1.

In a typical system based on rules, efficient filtering of a large set of conditional expressions is critical for the scalability of the system. Unlike a typical database design, where a few queries are executed on a large set of rows in a table, a rules-based system has a large number of expressions (similar to WHERE clause of a query) operating against a single data item.

The expressions defined for a given application are relatively static and the rate at which the new data should be processed against these expressions is high. Therefore, according to one aspect, pre-processing of the expressions is performed to build specialized data structures and data access mechanisms such as indexes, to allow fast filtering with a new data item.

Pre-Processing a Set of Expressions

Non-XML Expressions

Given a large number of non-XML conditional expressions in a system, the expressions tend to have similarities at the elementary predicates level. That is, two expressions, each with one or more elementary predicates joined by conjunctions, may have a common predicate. Thus, expression evaluation costs are shared among multiple expressions, thereby leveraging the foregoing similarities. In an embodiment, a library of functions, the Expression Type Library, supports the pre-processing of a set of expressions.

The Expression Type Library includes routines that provide the basic functionality required for building a matching network for non-XML expressions. The routines in this library are supplied as a set of Java classes which are capable of converting an expression string into an expression tree containing elementary predicates, joined by conjunctions and disjunctions. This library can be used by any indexing scheme for pre-processing the expressions in an expression set and during incremental modifications to these expressions.

This library includes routines for parsing the non-XML expressions and processing them as follows:

(1) Normalize the non-XML expression, for example, by rearranging the predicates in an expression to rewrite it in a disjunctive normal form (DNF), that is, an OR list of AND sub-clauses. For example, an expression of form SYMBOL='GE' and (PRICE<25 or PRICE>35)

is rewritten as follows after a DNF conversion:

(SYMBOL='GE' and PRICE<25) or
(SYMBOL='GE' and PRICE>35).

(2) Normalize the predicates, by rewriting each predicate in a non-XML expression such that it has a pure constant on the right-hand side. For example, a predicate of form

PRICE>27+CHANGE is rewritten as:

PRICE−CHANGE>27

(3) Decode the predicate, by resolving it as follows:

left-hand side (LHS): an expression or a function of one or more attributes (e.g., PRICE−CHANGE from the predicate PRICE−CHANGE>27);

right-hand side (RHS): a constant (e.g., the "27" from the predicate PRICE−CHANGE>27); and relational operator: the relational operator joining the LHS and RHS (e.g., the ">" from the predicate PRICE−CHANGE>27).

The left-hand side of a predicate, for example, the attribute SYMBOL, is also referred to as a complex attribute. It could also be a sub-expression involving one or more elementary attributes or user-defined functions, for example, CHANGE/PRICE. The operators of a predicate are mapped to a predetermined integer value, however, embodiments are not limited to such a mapping. The mapped operators and associated predicate constants (RHS) are stored in a predicate table.

An attribute set that captures the event structure or context is created. The attribute set has a list of elementary attributes used in a non-XML expression set, and their data types. In its simplest form, the attribute set resembles an abstract type definition in the database.

The non-XML expression set is stored in a column of a table. For example, expressions can be stored in a VARCHAR2 or a CLOB column in a database table. Such a column can be recognized as a column of EXPRESSION data type by, for example, associating some expression set metadata to the column. Furthermore, the column storing the non-XML expression set is associated with the attribute set created for the expression set.

A VARCHAR2 or a CLOB column associated with an attribute set constitutes an EXPRESSION column. The values stored in an EXPRESSION column are treated as expressions and they are initially expected to adhere to SQL-WHERE clause format. These expressions can use all the attributes defined in the attribute set along with any system variables and user-defined functions that are valid in the user environment.

XPath Expressions

SQL-WHERE clause expressions may contain XPath predicates on one or more elementary attributes for an event structure. In one commercial database implementation, an XMLType data type is used to create the elementary attributes for an event structure. Furthermore, the XPath predicates on these attributes are specified using the operators supplied with the XMLType attribute.

For example, in an event structure that includes definition of a "resume" attribute of XMLType or similar data type (hereinafter referred to as XMLType), XPath predicates on this attribute are specified in SQL-WHERE clause format as follows:

--- existsNode(resume,'/RESUME/EDUCATION[@degree="Masters"]')=1
extract(resume,'/RESUME/EDUCATION[@degree="Masters"]') is not null.

---

In general, the existsNode ( ) function returns true if the input document contains a node specified by the XPath expression supplied to the function. The extract ( ) function is often used when the XPath expression will result in a collection of nodes being returned, with the results of the function being either a document or a document fragment.

By allowing XPath predicates in SQL-WHERE clauses, embodiments support multiple XPath predicates as well as predicates on non-XML data and XML data in the same expression. An example is as follows:

---

Source = 'MONSTER.COM' and
    existsNode(resume,'/RESUME/EDUCATION[@degree="Masters"]')=1
    and
    existsNode(resume,'/RESUME/*/PUBLICATION[count( )>2]')=1.

A set of expressions defined on a common event structure can be stored in a database table in a column of VARCHAR2 or CLOB data type, for example. Refer to U.S. patent application Ser. No. 10/254,383 entitled "Managing Expressions In A Database System" for a description of one method for storing a set of expressions as data in a database table. Expressions in an expression set can then be evaluated for a data item with the use of standard SQL syntax, for example, as follows:

```
SELECT * FROM job_openings WHERE
    EVALUATE (condition,
    'source=>"MONSTER.COM",
    resume=>"<RESUME> . . . <.RESUME>"') = 1.
```

Typically, the left-hand-sides of XPath predicates contain XPath expressions as an argument to the existNode( ) or extract( ) operators. Due to the nature of XPath expressions, these left-hand-sides are quite unique and, unlike in the case of non-XML predicates described above, XPath predicates may not be grouped efficiently. For example, a large number of unique XPath expressions are possible with a small number of XML elements/nodes in an XML document. Thus, when predicates are grouped based on common left-hand-sides, a large number of groups are possible due to differences in the XPath expressions. Furthermore, there is a practical limit to the number of attributes that can be stored and indexed in a predicate table, thus not all of the unique left-hand-sides can be stored efficiently. Still further, processing cost is not shared across multiple predicates with partially matching XPath expressions. Hence, according to an aspect of the invention, a unique index can be configured for XPath expressions and associated predicates. The index is referred to herein as an "Expression Filter" index, and is described in detail below.

XPath Expression Filter

XPath expressions can appear in SQL-WHERE clauses along with other scalar predicates, such as A=10, B>20, and the like. In general and according to an aspect of the invention, the XPath expressions defined on a particular XMLType attribute are grouped together in a predicate table. Filtering parameters for the XMLType attribute can be set by recognizing some of the commonly appearing, or distinguishing, XML tags (i.e., XML Elements and XML Attributes) in the XPath expression set. These common XML tags can be configured to act as positional filters or value-based filters, as described in more detail below. Thus, for a set of XPath expressions, the positions of all the tags configured as positional filters and the constants appearing for all the predicates involving tags configured as value-based filters are determined and these positions and values are applied to an XML document, as described in more detail below.

In general, in order to create a specialized filter (sometimes referred to herein as an index) for XPath expressions, a user should identify the XMLType elementary attribute for which the XPath expressions are expected and a list of common XML elements and XML attributes expected in the expression set. In relation to the example above, the "resume" XMLType may be identified as an elementary attribute for which expressions are expected, "EDUCATION" may be identified as a common XML element associated with the "resume" XMLType, and "degree" may be identified as a common XML attribute associated with the "EDUCATION" element.

Tags in XPath expressions are in one of three categories: (1) XML Elements with simple types; (2) XML Elements with complex types; and (3) XML Attributes (with simple types). For a typical XPath expression set, this information is available from the XML schema corresponding to the expression set.

For an XPath filter, the XML elements and XML attributes are in one of three categories: (1) XML elements with complex types, or simple types that cannot be mapped to database types VARCHAR2, NUMBER, or DATE; (2) XML elements and attributes with simple types that can be mapped to database types VARCHAR2, NUMBER, or DATE; and (3) all other XML elements and attributes, including attributes with types that do not map to simple database types. Within an XPath Expression Filter, according to one embodiment, the XML tags that fall in category 1 are used as positional filters and the tags that fall in category 2 are used as value filters. The filtering based on the remainder of the tags is performed during a separate predicate evaluation phase, wherein they are evaluated linearly with respect to a given set of information. Refer to U.S. patent application Ser. No. 10/254,383 entitled "Managing Expressions In A Database System" for a description of one method for evaluating what are referred to as sparse predicates.

XPath Expression Filter Index

Figure 1:
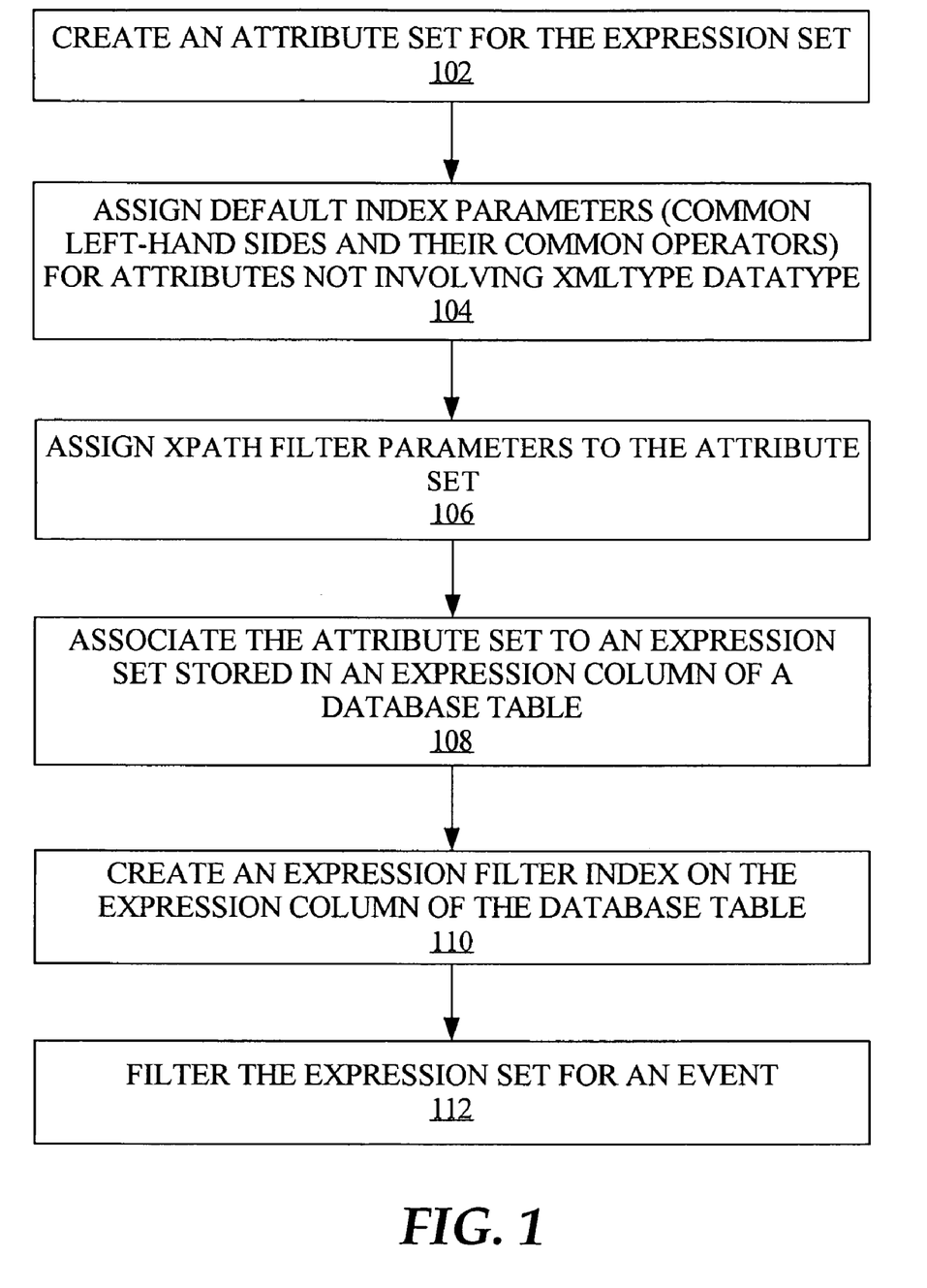
FIG. 1 is a flow diagram that illustrates a process for creating and using a specialized index to filter expressions.

FIG. 1 is a flow diagram that illustrates a process for creating and using a specialized index to filter expressions. Reference is also made to Appendix A for examples of SQL statements that may be used to carry out the steps of FIG. 1.

At block 102, an attribute set for the expression set is created. An attribute set is created in an attempt to capture the event structure or context. The attribute set has a list of elementary attributes used in an expression set, and their data types. For example, an attribute set for an expression set relating to the "resume" XMLType might include attributes such as "degree," "college", "honors," and the like. In its simplest form, the attribute set resembles an abstract type definition in the database. One non-limiting technique for creating an attribute set is expressed in Statement 1 of Appendix A.

At block 104, default index parameters are assigned for the attributes that do not involve attributes with XMLType datatype. For example, the default parameters preferably represent common left-hand sides of predicates from the expression set and their associated common operators. For example, "source" may be a common left-hand side and "=" may be a common operator associated with the "source" attribute. One non-limiting technique for assigning default index parameters for non-XML data is expressed in Statement 2 of Appendix A.

At block 106, XPath filter parameters are assigned to the attribute set. In one aspect, a predicate table is created based on these parameters, as described in detail below. One non-limiting technique for assigning XPath filter parameters to the attribute set is expressed in Statement 3 of Appendix A.

The XML document bound to the "news" attribute is not tied to a particular XML schema. Hence, any valid XML document can be bound to this attribute. Therefore, if a particular XML element with a particular name is expected in more than one context with different simple datatypes, the datatype of the element should preferably not be specified. When a datatype of an element is not specified, it is only used for positional filtering, not value filtering. Similarly, when an attribute with a same name (element name extended) appears in different contexts with different datatypes in a document, this element should preferably not be used as an XPath filtering parameter. These attributes can be evaluated as a sparse predicate by the expression filter process.

When an element with no value attribute is expected in almost every XPath expression, adding such element to the XPath filtering parameters will degrade performance because the element is not contributing to any filtering of expressions. An example of such an element is the "world" tag in the expression set of Appendix A.

At block 108, the attribute set is associated to the expression set stored in a column of a database table. Although reference is made herein to a database table, embodiments are not limited to use of a data table as the logical construct for organization of data elements. For example, object classes and associated objects may also be used. The column in which the expression set resides is referred to herein as the EXPRESSION column (entitled "Interest" in the table of Appendix A). One non-limiting technique for associating the attribute set to an expression set in a database table named "SUBSCRIBER" is expressed in Statement 4 of Appendix A.

At block 110, an expression filter index is created on the EXPRESSION column of the database table. Details of an expression filter index for XPath expressions, according to embodiments, are described further below. One non-limiting technique for creating an expression filter index is expressed in Statement 5 of Appendix A.

Testing every expression for a data item is a linear time solution. When a large set of expressions are defined, this approach is not scalable for a high volume of data items. Therefore, in an embodiment, a new indexing mechanism is used to evaluate a large set of XPath expressions efficiently and, consequently, to quicken the evaluation of the expression set for a given data item or data string. This index can be defined on an EXPRESSION column, thus a query optimizer can determine the use of the index for the evaluation of an expression set, based on the index usage cost. In an implementation, persistent database objects are created to maintain the index for an expression set, where pre-processing the expressions set at the time of index creation populates these database objects. Additionally, the information stored in these objects is maintained to reflect any changes to the expression set using DML operations on the table storing the expressions.

According to an embodiment, an Expression Filter is a set of PL/SQL packages and APIs to manage expressions in user tables, and to filter the expressions for a given data item, that is, to match criteria expressed in expressions with the given data item, using a standard SQL or other query language query. In a publication system, the expressions specify criteria that must be satisfied by data for the data to be of interest to a subscriber.

The Expression Filter comprises two components: an EVALUATE operator and an Expression Filter Indextype, which are described in detail below. The expression filter index created at block 110 refers to the Expression Filter Indextype, according to an aspect of the invention.

Expression Filter Index Type

In an embodiment, the indexing scheme is implemented as a new index type ("INDEXTYPE"), referred to as an Expression Filter ("EXPFILTER"), using an extensible indexing framework. In an implementation, the indexing scheme is implemented using the Oracle Extensible Indexing framework. The Expression Filter index type can be used to create an index on any set of expressions stored in a database column of type VARCHAR2, CLOB or BFILE. However, use of another index type other than the foregoing, which may be used on expressions stored as data types, is contemplated and therefore within the scope of embodiments of the invention. The expression set being indexed may include, for example, XPath expressions, non-XML expressions, and a combination of both types of expressions.

Returning to FIG. 1, at block 112, the expression set is filtered for an event, using the expression filter index created at block 110. Hence, for a given input set, or event, relevant expressions are identified for the event. For example, for a given input set defining one or more events, such as an XML document, a set of XPath expressions is evaluated, or filtered, in conjunction with the input set to identify expressions that are interested in a particular event. An example of a statement for filtering expressions for an event is expressed in Statement 6 of Appendix A.

EVALUATE Operator

An operator, EVALUATE, is introduced that processes the expression set stored in an EXPRESSION column. This operator can be used in the WHERE clause of a standard SQL, or a DML statement, to filter the expressions for a data item. The predicate on the expression set, using the operator EVALUATE, can be combined with any other predicate on the table. The EVALUATE operator accepts the name of the column storing the expressions, e.g., INTEREST, and a given data item as arguments. In the context of the example of Appendix A, the data item is "newsevent" (an instance of the Abstract type associated with the attribute set). The EVALUATE operator internally uses the expression set metadata to evaluate expressions for data items passed in.

The query on the table in which expressions are stored can be extended to include multi-table joins and any other database query operations using GROUP BY clause, ORDER BY clause, HAVING clause etc. In addition, filtering a set of expressions for a batch of data items by joining the table in which expressions are stored with the table storing the data items being processed (i.e., the data, such as an XML document, to which the expressions are compared) is contemplated. In the example of Appendix A, such a query would include the database table named SUBSCRIBER and a table storing the data items (e.g., a table entitled WEEKLY_NEWS, which stores values for each of the source and news attributes)

Indexing XPath Expression Predicates

Overview of XPath Expression Filtering

In an embodiment, the data structures used to group the predicates in an expression set are relational in nature. In an implementation in which persistent database objects are used for the Expression Filter index data structure, an example of such database objects are as follows:

Predicate Table: a relational table that stores the predicates appearing in the expressions;

Bitmap Indexes: one or more bitmap indexes on the predicate table; and

Access Function: a function that queries the predicate table to filter the expressions for a data item.

These objects collectively provide for efficient filtering of XPath expressions based on the position of XML elements in a given XPath expression as well as based on the values of XML attributes associated with XML elements. Furthermore, since the index structure objects are persistently stored in the database, memory constraints associated with the size of expression sets in prior approaches, which typically use main memory extensively, are not applicable to the present embodiments. By contrast, operations using the present embodiments can store the necessary database blocks into a database buffer cache as they are needed.

As described above, expressions from a given set of expressions refer to a set of elementary attributes with fixed data types. Further, a set of valid values for these attributes constitute a data item, which is evaluated against these expressions. Hence, to index a set of expressions with the Expression Filter index type, all the elementary attributes used in the expression set should be associated with the database column storing the expressions, such as at block 108 of FIG. 1. These elementary attributes, perhaps along with some optional complex attributes, constitute the attribute set for the expression set which are stored in one or more data dictionary tables.

Generally, utilization of the indexing scheme described herein, implemented as a new Indextype (i.e., Expression Filter index type) and applied to a column storing expressions as data, provides a method for efficiently evaluating large sets of XPath expressions by allowing the EVALUATE operator to use the Expression Filter index.

XPath Expression Index

Filtering a large set of expressions with XPath predicates necessitates different treatment for the XPath predicates on XML data than for predicates defined for non-XML data. Categorizing predicates with XPath expressions into two classes: (1) predicates in which the existence of an XML node is of interest, and (2) predicates in which the non-existence of an XML node is of interest; the predicates in the first class are considered primary candidates for indexing. The predicates in the second class are maintained in their original form and evaluated by submitting them to a database server.

An XPath expression that is a candidate for indexing may not filter a given expression based on all of the path nodes and path predicates in the index evaluation phase. Thus, during evaluation of data, which includes filtering expressions from an expression set, XPath expressions that evaluate to true with application of the index are, in one embodiment, further processed to check all of the path nodes and path predicates. To that end, the original forms of the XPath expressions are also maintained, but processed only if the indexed portion of the XPath expression evaluates to true for a given data item. In one embodiment, the expressions, or predicates, are maintained in their original form in a column of the predicate table. Furthermore, XPath expressions in their original form may be stored in the same column as non-XML predicates that are not indexed.

In one embodiment, predicates that appear in disjunctions are not indexed. Such predicates are evaluated in another phase if the indexed portion of the XPath expression evaluates to true. In another alternative embodiment, the XPath expressions are rewritten as a disjunction of two or more XPath expressions that do not contain disjunctions (equivalent to the Disjunctive Normal Form for conditional expressions), and each XPath expression is treated separately.

According to an aspect of the invention, multiple XPath expressions on an XMLType attribute are indexed based on (1) the level of the XML elements of interest, and (2) the value of the XML attributes of interest. A user could configure such an index by choosing the more distinguishing XML elements and attributes used in a set of XPath expressions for an XMLType attribute. If the XPath expressions for an XMLType attribute are available before index creation, statistics on the expression set can be collected to identify the distinguishing XML elements and attributes. A conventional data table, referred to as a predicate table, is used to maintain the index information for a set of XPath expressions. In addition, a given predicate table may also, or alternatively, include representations of non-XML expressions.

For every distinguishing XML element for which the index is configured, the level at which the XML element should appear in the hierarchy or tree that defines a given XML document, for the XPath expression to evaluate to true, is stored. In one embodiment, the level information for an XML element is stored in two parts: (1) a level constraint, and (2) a bounding level.

For example, the following XPath expression is interested in the XML element AUTHOR appearing at level 2, or the second level of the XML document hierarchy:

/PUBLICATION/AUTHOR[@name="SCOTT"].

The following XPath expression is interested in the XML element AUTHOR appearing at level 2 or higher of the XML document, indicated by the double-slash after first level, which specifies all descendents of the context node PUBLICATION:

/PUBLICATION//AUTHOR[@name="SCOTT"].

Hence, for the first expression, ('=', 2) is stored in the index and for the second expression, ('=>', 2) is stored in the index. The operator in each expression, such as '=' and '=>', are what is referred to above as level constraint, and the bounding level is '2' in both expressions. In one embodiment, the two pieces of information for each expression are collapsed by using an encoding scheme. For example, a negative number could be used to represent a range of levels, such as '-2' representing "=>2" and a positive number could be used to indicate a particular range.

If an element appears at more than one level in an XPath expression, only the last occurrence is stored. Furthermore, if an XPath expression is interested in the existence of an element in a range of levels, such as with the use of ancestor/descendent semantics in XPath, the level constraint of the element captures this information.

For a distinguishing XML attribute for which the index is configured, two pieces of information are stored for every XPath expression that includes a predicate on that attribute: (1) the relational operator used in the predicate, and (2) the constant in the predicate. In an implementation, XML attributes are, by default, considered to be of "string" data type. However, as an implementation detail, the attribute definition can be overridden with a different data type to ensure correct range predicate results. For example, two Date fields defined as strings may not return the same results upon comparison.

Returning to the foregoing expressions for an example, ('=', "SCOTT") or a representation thereof is stored in reference to the "name" attribute of the AUTHOR element of such expressions.

In an embodiment, a predicate table comprises two dedicated columns for each XML element and XML attribute for which an index is configured. Each row in the predicate table corresponds to an XPath expression, hence, an identifier of each expression is also stored in such table. In the case of a tag configured as a positional filter, one column captures wildcard matches regarding positions (e.g., ANCESTOR, ANCESTOR-OR-SELF, DESCENDENT, DESCENDENT-OR-SELF). For example, logical relationships between positions of an element in an expression and a corresponding element in a data item include equal to, greater than, less than, greater than or equal to, and less than or equal to. The other column stores the position information for the tag in the XPath expression, which corresponds to the element's position within an XML document. In the case of a value-based filtering tag, one column stores the operator of the predicate and the other column stores the constant that appears in the predicate with the XML tag in the XPath expression. Encoding the two columns for XML elements into a single column and the two columns for XML attributes into a single column is specifically contemplated, but not required.

According to an embodiment, the predicate table further comprises a column that is defined with a VARCHAR2 data type, for storing XPath predicate expressions in their original form. Furthermore, storing indexing information for non-XML data in the same table as XPath expression indexing information is specifically contemplated.

A query, using SQL for example, can be issued against the predicate table to evaluate the expression set represented therein in conjunction with a data set, such as an XML document and/or non-XML data. In an embodiment, a concatenated bitmap index is created on the columns of a predicate table that correspond to each XML attribute and XML element, to execute an evaluation query efficiently. Such bitmap indexes function as a multi-dimensional index during the expression set evaluation, and operate to filter expressions based on multiple elements and attributes simultaneously. Additionally, creating a concatenated bitmap index for the XPath columns and columns storing indexing information for non-XML data is specifically contemplated.

Example Predicate Table

An example of a predicate table is illustrated below, based on the following scenario. Consider the following expressions defined on two variables, "source" and "news", where "source" is a text variable and "news" a XML type variable.

source = 'CNN' and
    existsNode (news, '/world/sports/olympics/football[team='US']') = 1
source = 'CBS' and
    existsNode (news, '/world/us/sports/football[team='JETS']') = 1
source = 'FOX' and
    existsNode (news, '/world/sports/football[team='ENG']') = 1
    existsNode (news, '//sports/football[teams='TITANS']') = 1

The table storing these expressions has r1, r2, r3, and r4 as their corresponding record identifiers.

For this expression set, "source" can be chosen as one of the predicate left-hand-sides that can be indexed according to techniques for non-XML data. Additionally, the XPath predicates on the "news" XMLType data can be indexed by identifying the following filtering attributes:

Value Filter:
    football@team
Positional Filters:
    sports, and
    football.

For such a configuration, a predicate table is created as shown below.

| Row Id | G1_OP | G1_CT | G2_OP | G2_CT | G3_OP | G3_CT | G4_OP | G4_CT | Sparse |
|---|---|---|---|---|---|---|---|---|---|
| r1 | = | CNN | = | US | = | 2 | = | 4 | existsNode (news, '/world/sports/olympics/football[team='US']') = 1 |
| r2 | = | CBS | = | JETS | = | 3 | = | 4 | existsNode (news, '/world/us/sports/football[team='JETS']') = 1 |
| r3 | = | FOX | = | ENG | = | 2 | = | 3 | existsNode (news, '/world/sports/football[team='ENG']') = 1 |
| r4 | | | = | TITANS | >= | 1 | >= | 2 | existsNode (news, '//sports/football[teams='TITANS']') = 1 |

Where,
G1_OP: relational operator for predicates on the "source" variable;
G1_CT: RHS (right-hand-side) constant for predicates on the "source" variable;
G2_OP: relational operator for the value predicate on football@team of the "news" variable;
G2_CT: RHS constant for the value predicate on football@team;
G3_OP: relational operator for the positional predicate on the "sports" element of the "news" variable;
G3_CT: constant for the positional predicate on the "sports" elements;
G4_OP: relational operator for the positional predicate on the "football" element of the "news" variable;
G3_CT: constant for the positional predicate on the "football" elements; and
Sparse: The sparse predicate column storing the XPath predicates in their original form, which are evaluated only when the positional and value-based filters evaluate to true for a given data item (e.g., an XML document as a value for "news" variable). Numerical values can be used to represent the '=' and '>=' relational operators.

Predicate Evaluation

In an embodiment, in analysis of predicates in XPath expressions, the predicates in an expression set can be classified into two sets as described below, with each set evaluated in turn.

(1) Predicates with indexed attributes (in reference to Statement 3 of Appendix A, examples include tag names 'sports', 'football' and 'football@team', for which tag_indexed =>'YES'), which are considered more selective and for which bitmap indexes are created; and predicates with stored attributes (in reference to Statement 3 of Appendix A, an example includes tag name 'world@pubdate', for which tag_indexed=>'NO'), which are considered less selective. Dedicated columns are created in the predicate table for the predicate groups belonging to this set. For example, predicates on distinguishing XML elements and attributes in XPath expressions fall into this first set.

(2) Predicates with other XML elements and attributes, which are only captured in the original form of XPath expressions, i.e., they are not considered necessarily selective and thus are not stored in the dedicated columns as with those in set (1).

The first phase of evaluation, with respect to the first set of predicates, narrows down the working set of expressions by eliminating the XPath expressions that are conclusively false for a given XML document. The second phase of evaluation, with respect to predicates stored in their original form, evaluates the complete XPath predicate for the smaller working set that was minimized via the first phase of evaluation.

Figure 2:
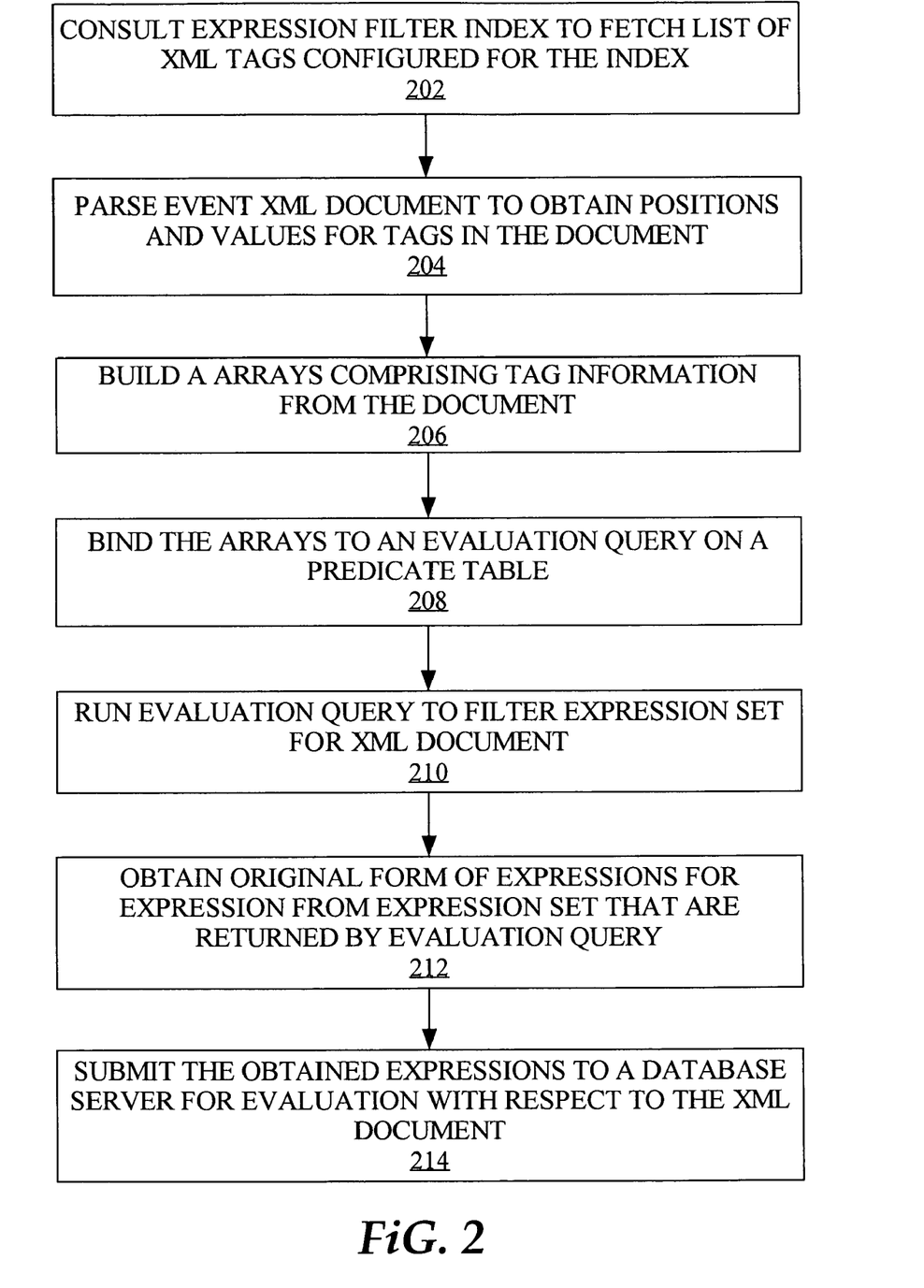
FIG. 2 is a flow diagram that illustrates a process for filtering XPath expressions.

FIG. 2 is a flow diagram that illustrates a process for filtering XPath expressions, according to an embodiment of the invention. The process of FIG. 2 is preferably performed for each instance of an XMLType attribute that has been created for and which is associated with an event structure for which the XPath expressions are applied. The process of FIG. 2 may be performed to complete block 112 of FIG. 1.

At block 202, an expression filter index, configured as described above, is consulted to fetch the list of XML tags configured for the index. Recall that the list of XML tags may comprise tags associated with XML elements and XML attributes. Thus, the XPath expression information that resides in the special columns of the predicate table is extracted, that is, the positional and value-based filter information described above.

At block 204, an event input set, such as an XML document, is parsed to obtain the positions and values for tags in the document. In an embodiment, an XML DOM (Document Object Model) parser is used to obtain the elements, attributes, and the like from the document. At block 206, arrays are built which comprise the tag information of the document, obtained at block 204. In an embodiment, each tag information associated with a tag from the document comprises the tag name, tag type, a VARRAY of all the positions of the tag in the document, and the values that appear with the tag in the current document.

At block 208, the arrays are bound to an evaluation query that is issued on the predicate table. Relevant portions of a generalized example of such an evaluation query follows:

```
SELECT * FROM <XPath Predicate Table>
WHERE [comment: for each XML element configured for a position filter]
((E1_LVL_CNSTR = '=' and [comment: level check for element E1]
    E1_ABS_LVL in [comment: level equality check]
        (select column_value from table (:E1_LVLS_VARRAY))) or
(E1_LVL_CNSTR = '>=' AND [comment: level in range]
    E1_ABS_LVL <=
        (select max(column_value) from table (:E1_LVLS_VARRAY))))
AND
... [comment: more element checks]
AND [comment: for each XML attribute configured as value filter]
((A1_VAL_OPER = '=' and [comment: attribute value equality check]
    A1_VAL_CONST in
        (select column_value from table (:A1_VALS_VARRAY))) or
... [comment: check other types of operators on this attribute]
AND
... [comment: more attribute checks];
``` where:

E1_LVL_CNSTR and E1_ABS_LVL are columns in the XPath predicate table, which map to level constraint and absolute level of an XML element (e.g., sports) configured for the index;

:E1_LVLS_VARRAY is a VARRAY containing all the levels at which the XML element (e.g., sports) corresponding to E1 appears in the given XML document;

A1_VAL_OPER and A1_VAL_CONST are the columns in the XPath predicate table to store operators and constants of predicates appearing with an XML attribute (e.g., football@team); and :A1_VALS_VARRAY is a VARRAY of the values for all the occurrences of the XML attribute (e.g., football@team) in the given XML document.

At block 210, such an evaluation query is run to filter the expression set for the given XML document. The evaluation query returns a small list of XPath expressions that are potentially true for the XMLType instance (e.g., news) passed in. For these expressions, at block 212, the original form of the expressions is obtained. In an embodiment, the original expressions are obtained from a column of the predicate table in which they are stored in that form. At block 214, the original form of the expressions for the expressions that are returned by the evaluation query are submitted to a database server for further evaluation in relation to the given XML document.

To evaluate simple (i.e., non-XML) predicates in conjunction with XML predicates (e.g., XPath expressions) using the predicate table, the WHERE clause of the query on the predicate table is enhanced to include the evaluation of simple predicates. Furthermore, bitmap indexes can be created on the columns storing XML and non-XML predicates to provide faster evaluation.

The foregoing description is presented in the context of XPath expressions and XML documents for explanatory purposes; however, embodiments are not so limited. The methods and systems described herein may be applied to hierarchically structured data in general, in which elements or data items are identified through some type of path designation. For example, the teachings may be applied to name-value pairs that are represented or maintained in a hierarchical tree structure and located within the tree structure by a pathname, to filter a set of pathnames for a given hierarchical data item of name-value pairs.

Figure 3:
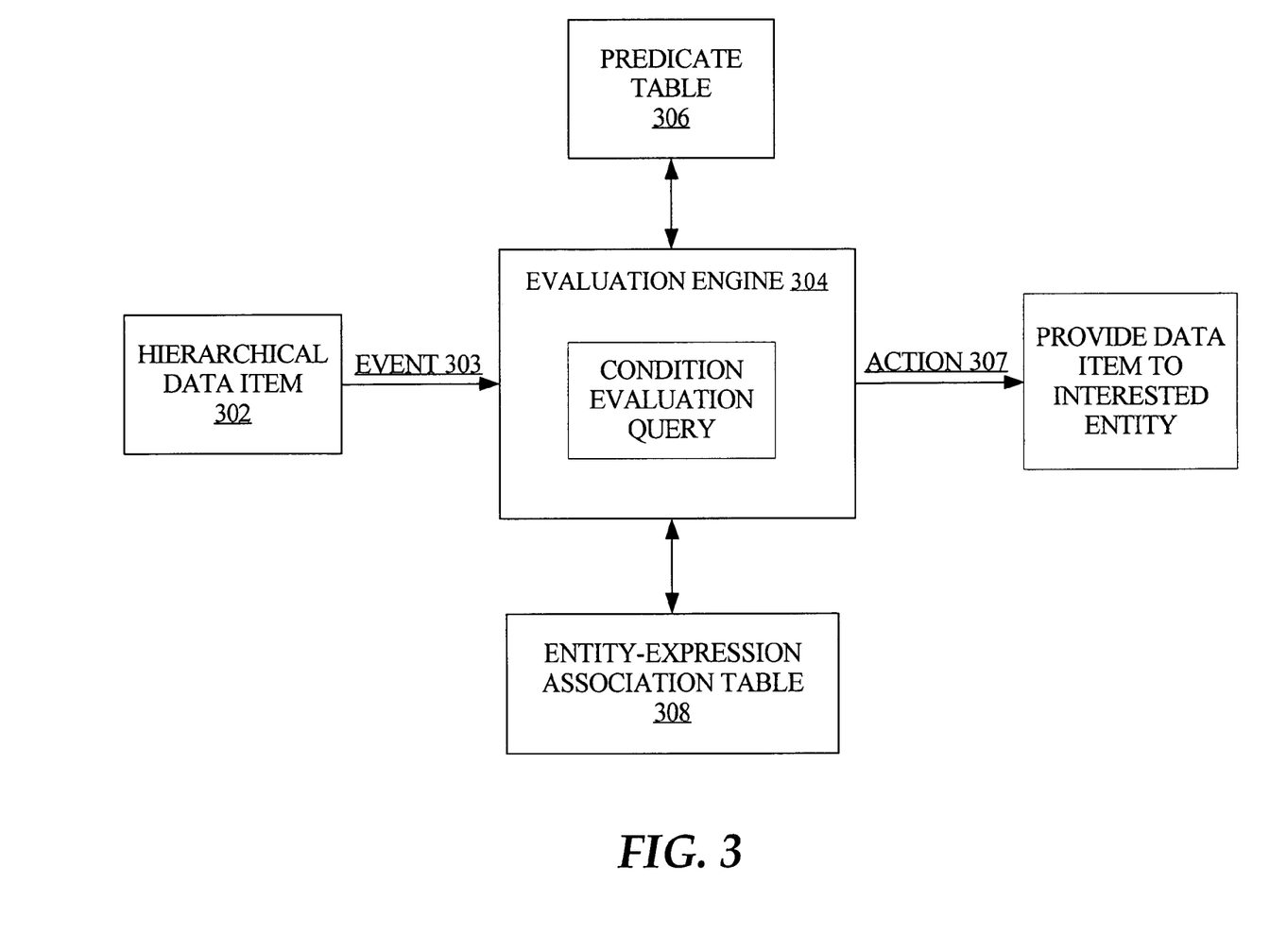
FIG. 3 is a block diagram that depicts interaction between functional components in carrying out the process described in reference to FIG. 2.

The predicate table is described above as being used to filter an expression set and as being an index. FIG. 3 is a block diagram that depicts interaction between functional components in carrying out the process described in reference to FIG. 2.

In the context of filtering an expression set, the expression set is pared down to expressions that do or are likely to match a given hierarchical data item, based on the expressions. For example, the processes may be used in an event content subscriber-publisher context, in which arrival of a hierarchical data item 302 (e.g., an XML document) is an event 303 which is evaluated by a condition evaluation engine 304 to determine whether any expressions in the expression set match the data item based on the condition information provided by the expressions (i.e., element level and attribute value) as represented in a predicate table 306, for which a resultant action 307 is to provide the hierarchical data item to an entity (e.g., user, or subscriber) associated with a matching expression. In the context of an index, the predicate table 306, which comprises a set of expressions associated with entities, is used by the condition evaluation engine 304 to determine expressions in the expression set that match a given data item 302 which, once determined, are used to identify respective entities associated with the matching expressions wherein the entity-expression associations are stored in another table, such as entity-expression association table 308. In such a scenario, the predicate table 306 is used as an index to the entity-expression association table 308. Thus, action 307 can be performed by providing to the identified entities the data items in which they are interested.

The techniques described herein integrate expression filtering operations into database operations. In the context of an information subscription-publication system, as a result of the integration of expressions and filtering mechanisms into a database system, mutual filtering from both a subscriber and a publisher can be performed, and performed efficiently, through use of standard SQL statements. Therefore, multi-domain queries are possible, by joining tables and adding predicates to a query to further filter expressions. Furthermore, batch evaluation of expression sets for a given set of data is possible by joining the table storing the expressions with the table storing the data items. Still further, filtering can be performed on both XML and non-XML information in the same query and, thus, as part of the same evaluation process.

Hardware Overview

Figure 4:
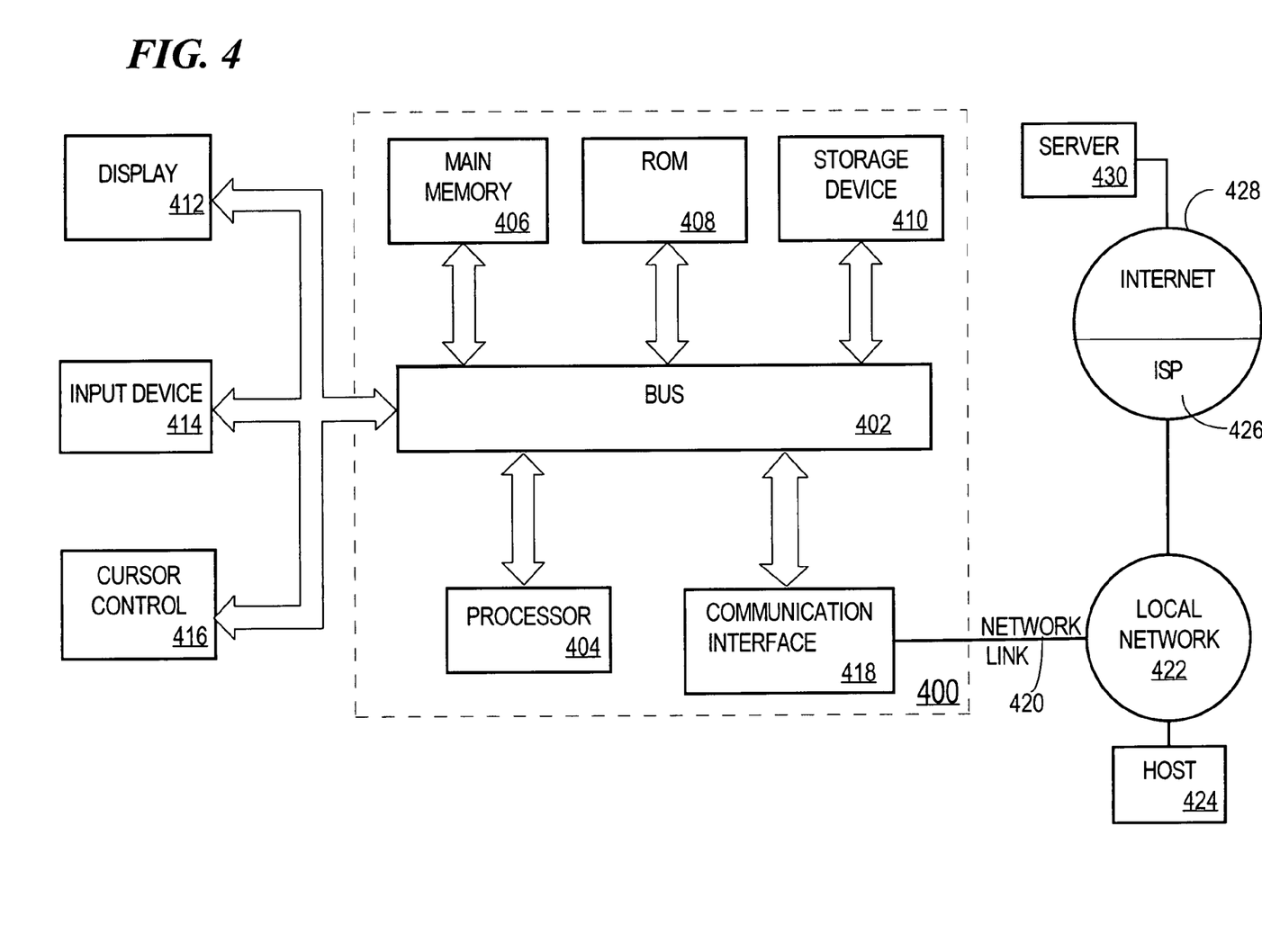
FIG. 4 is a block diagram that illustrates a computer system upon which an embodiment of the invention may be implemented.

FIG. 4 is a block diagram that illustrates a computer system 400 upon which an embodiment of the invention may be implemented. Computer system 400 includes a bus 402 or other communication mechanism for communicating information, and a processor 404 coupled with bus 402 for processing information. Computer system 400 also includes a main memory 406, such as a random access memory (RAM) or other dynamic storage device, coupled to bus 402 for storing information and instructions to be executed by processor 404. Main memory 406 also may be used for storing temporary variables or other intermediate information during execution of instructions to be executed by processor 404. Computer system 400 further includes a read only memory (ROM) 408 or other static storage device coupled to bus 402 for storing static information and instructions for processor 404. A storage device 410, such as a magnetic disk, optical disk, or magneto-optical disk, is provided and coupled to bus 402 for storing information and instructions.

Computer system 400 may be coupled via bus 402 to a display 412, such as a cathode ray tube (CRT) or a liquid crystal display (LCD), for displaying information to a computer user. An input device 414, including alphanumeric and other keys, is coupled to bus 402 for communicating information and command selections to processor 404. Another type of user input device is cursor control 416, such as a mouse, a trackball, or cursor direction keys for communicating direction information and command selections to processor 404 and for controlling cursor movement on display 412. This input device typically has two degrees of freedom in two axes, a first axis (e.g., x) and a second axis (e.g., y), that allows the device to specify positions in a plane.

The invention is related to the use of computer system 400 for implementing the techniques described herein. According to one embodiment of the invention, those techniques are performed by computer system 400 in response to processor 404 executing one or more sequences of one or more instructions contained in main memory 406. Such instructions may be read into main memory 406 from another computer-readable medium, such as storage device 410. Execution of the sequences of instructions contained in main memory 406 causes processor 404 to perform the process steps described herein. In alternative embodiments, hard-wired circuitry may be used in place of or in combination with software instructions to implement the invention. Thus, embodiments of the invention are not limited to any specific combination of hardware circuitry and software.

The term "computer-readable medium" as used herein refers to any medium that participates in providing instructions to processor 404 for execution. Such a medium may take many forms, including but not limited to, non-volatile media, volatile media, and transmission media. Non-volatile media includes, for example, optical, magnetic, or magneto-optical disks, such as storage device 410. Volatile media includes dynamic memory, such as main memory 406. Transmission media includes coaxial cables, copper wire and fiber optics, including the wires that comprise bus 402. Transmission media can also take the form of acoustic or light waves, such as those generated during radio-wave and infra-red data communications.

Common forms of computer-readable media include, for example, a floppy disk, a flexible disk, hard disk, magnetic tape, or any other magnetic medium, a CD-ROM, any other optical medium, punchcards, papertape, any other physical medium with patterns of holes, a RAM, a PROM, and EPROM, a FLASH-EPROM, any other memory chip or cartridge, a carrier wave as described hereinafter, or any other medium from which a computer can read.

Various forms of computer readable media may be involved in carrying one or more sequences of one or more instructions to processor 404 for execution. For example, the instructions may initially be carried on a magnetic disk of a remote computer. The remote computer can load the instructions into its dynamic memory and send the instructions over a telephone line using a modem. A modem local to computer system 400 can receive the data on the telephone line and use an infra-red transmitter to convert the data to an infra-red signal. An infra-red detector can receive the data carried in the infra-red signal and appropriate circuitry can place the data on bus 402. Bus 402 carries the data to main memory 406, from which processor 404 retrieves and executes the instructions. The instructions received by main memory 406 may optionally be stored on storage device 410 either before or after execution by processor 404.

Computer system 400 also includes a communication interface 418 coupled to bus 402. Communication interface 418 provides a two-way data communication coupling to a network link 420 that is connected to a local network 422. For example, communication interface 418 may be an integrated services digital network (ISDN) card or a modem to provide a data communication connection to a corresponding type of telephone line. As another example, communication interface 418 may be a local area network (LAN) card to provide a data communication connection to a compatible LAN. Wireless links may also be implemented. In any such implementation, communication interface 418 sends and receives electrical, electromagnetic or optical signals that carry digital data streams representing various types of information.

Network link 420 typically provides data communication through one or more networks to other data devices. For example, network link 420 may provide a connection through local network 422 to a host computer 424 or to data equipment operated by an Internet Service Provider (ISP) 426. ISP 426 in turn provides data communication services through the world wide packet data communication network now commonly referred to as the "Internet" 428. Local network 422 and Internet 428 both use electrical, electromagnetic or optical signals that carry digital data streams. The signals through the various networks and the signals on network link 420 and through communication interface 418, which carry the digital data to and from computer system 400, are exemplary forms of carrier waves transporting the information.

Computer system 400 can send messages and receive data, including program code, through the network(s), network link 420 and communication interface 418. In the Internet example, a server 430 might transmit a requested code for an application program through Internet 428, ISP 426, local network 422 and communication interface 418.

The received code may be executed by processor 404 as it is received, and/or stored in storage device 410, or other non-volatile storage for later execution. In this manner, computer system 400 may obtain application code in the form of a carrier wave.

Extensions and Alternatives

Alternative embodiments of the invention are described throughout the foregoing description, and in locations that best facilitate understanding the context of the embodiments. Furthermore, the invention has been described with reference to specific embodiments thereof. It will, however, be evident that various modifications and changes may be made thereto without departing from the broader spirit and scope of the invention. For example, implementations were presented in which SQL is used; however, the techniques described herein are not limited to use with SQL, for other data query languages may be applicable. For another example, implementations were presented in the context of a XML document; however, advantages and use of embodiments of the invention are not limited to this context. For one more example, implementations were presented in which a concatenated bitmap index is created on columns of a predicate table. However, embodiments are not limited to such an index, for other index types that are suitable for indexing multiple columns of data tables are also applicable. Therefore, the specification and drawings are, accordingly, to be regarded in an illustrative rather than a restrictive sense.

In addition, in this description certain process steps are set forth in a particular order, and alphabetic and alphanumeric labels may be used to identify certain steps. Unless specifically stated in the description, embodiments of the invention are not necessarily limited to any particular order of carrying out such steps. In particular, the labels are used merely for convenient identification of steps, and are not intended to specify or require a particular order of carrying out such steps.

APPENDIX A

The following abstract data type represents the structure of a data item for which a large set of expressions is defined, and is related to News subscriptions.

```
CREATE or REPLACE TYPE newsevent AS
    OBJECT (source VARCHAR2(30), --(comment:
    source of the News) news sys.XMLType.------
    (comment: the News)
```

Furthermore, a set of expressions defined for the foregoing data structure is stored in a SUBSCRIBER table as follows.

| ID | INTEREST |
|---|---|
| 1 | source = 'CNN' and existsNode (news, '/world/sports/olympics/football[team='US']') = 1 |
| 2 | source = 'CBS' and existsNode (news, '/world/us/sports/football[team='JETS']') = 1 |
| 3 | source = 'FOX' and existsNode (news, '/world/sports/football[team='ENG']') = 1 |
| 4 | existsNode (news, '//sports/football[teams='TITANS']') = 1 |
| ... | |

Statement 1 (Block 102—Create attribute set for expression set):

```
EXECUTE dbms_expfil.create_attribute_set (
    attr_set => 'NEWSEVENT',
    from_type => 'YES')
```

Statement 2 (Block 104—Assign default index parameters for non-XML data):

```
EXECUTE dbms_expfil.default_index_parameters (
    attr_set => 'NEWSEVENT',
    attr_list => exf$attribute_list(
        exf$attribute(attr_name => 'SOURCE',
            attr_oper => exf$indexoper('='),
            attr_indexed => 'YES')))
```

Statement 3 (Block 106—Assign XPath filter parameters to the attribute set):

```
EXECUTE dbms_expfil.xpath_filter_parameters (
    attr_set => 'NEWSEVENT',
    xml_attr => 'NEWS',
    tag_list => exf$xpath_tags (
        exf$xpath_tag(tag_name => 'sports',
            tag_type => null,
            tag_indexed => 'YES'),
        exf$xpath_tag(tag_name => 'football',
            tag_type => null,
            tag_indexed => 'YES'),
        exf$xpath_tag(tag_name => 'football@team',
            tag_type => VARCHAR2(20),
            tag_indexed => 'YES'),
        exf$xpath_tag(tag_name => 'world@pubdate',
            tag_type => DATE,
            tag indexed => 'NO')
    )
).
```

Statement 4 (Block 108—Associate the attribute set with the expression set):

```
EXECUTE dbms_expfil.assign_attribute_set (
    attr_set => 'NEWSEVENT',
    tab_name => 'SUBSCRIBER'
    exp_column => 'INTEREST')
```

Statement 5 (Block 110—Create an expression filter index on expression column of predicate table):

```
CREATE INDEX xpath_filter ON subscriber (inter-
    est) INDEXTYPE IS exfsys.EXPFILTER.
```

Statement 6 (Block 112—Filter the expressions for an event):

```
SELECT * FROM subscriber WHERE EVALUATE (interest,
    Sys.AnyData.convertObject(newsevent(
        source =>'CNN',
        news =>
            XMLType ('<?xml version="1.0"?>
                <world pubdate="20-NOV-2002">
                    <sports>
                        <football team="TITANS">
                            <week10 opponent="RAIDERS">
                                <stats> ... </stats>
                            </week10>
                        </football>
                    </sports>
                </world>')))) = 1 AND ...
```

What is claimed is:

1. A method for determining entities that are interested in a particular XML document comprising the steps of:

parsing, using a computer processor, the XML document to obtain levels for elements and values for attributes within the XML document;

generating first data that represents the elements and their respective levels and that represents the attributes and their respective values;

reading, from one or more data tables, second data that characterizes XPath expressions associated with a plurality of entities; and determining, based at least in part on comparing the first data and the second data, whether an entity of the plurality of entities is interested in the XML document.

2. The method of claim 1, wherein the first data comprises tag information corresponding to tags within the XML document, and wherein generating the first data includes generating, for each tag within the XML document, data that represents (a) a tag name, (b) positions of the tag in the document, and (c) values for attributes corresponding to occurrences of the tag in the XML document.

3. The method of claim 2, wherein generating the first data includes generating the data that represents the positions of the tag as a variable array (VARRAY) data type.

4. The method of claim 2, wherein generating the first data includes generating the data that represents the values for the attributes as a variable array (VARRAY) data type.

5. A computer-readable storage medium storing one or more sequences of instructions which, when executed by one or more computer processors, causes the one or more computer processors to perform the method recited in claim 4.

6. A computer-readable storage medium storing one or more sequences of instructions which, when executed by one or more computer processors, causes the one or more computer processors to perform the method recited in claim 2.

7. The method of claim 1, wherein reading the second data includes reading position filter data corresponding to the XPath expressions, wherein each position filter data represents a level, within a hierarchical structure associated with an XML document in which an associated entity is interested, associated with a corresponding tag within an XML document in which the associated entity is interested.

8. A computer-readable storage medium storing one or more sequences of instructions which, when executed by one or more computer processors, causes the one or more computer processors to perform the method recited in claim 3.

9. A computer-readable storage medium storing one or more sequences of instructions which, when executed by one or more computer processors, causes the one or more computer processors to perform the method recited in claim 7.

10. The method of claim 1, wherein reading the second data includes reading value filter data corresponding to the XPath expressions, wherein each value filter data represents a conditional expression relating to an attribute associated with a tag within an XML document in which an associated entity is interested.

11. A computer-readable storage medium storing one or more sequences of instructions which, when executed by one or more computer processors, causes the one or more computer processors to perform the method recited in claim 10.

12. The method of claim 1, wherein comparing the first data and the second data is performed by executing, by a database server, a database query language statement.

13. The method of claim 12, wherein the database query language statement is a Structured Query Language (SQL) statement.

14. A computer-readable storage medium storing one or more sequences of instructions which, when executed by one or more computer processors, causes the one or more computer processors to perform the method recited in claim 13.

15. A computer-readable storage medium storing one or more sequences of instructions which, when executed by one or more computer processors, causes the one or more computer processors to perform the method recited in claim 12.

16. The method of claim 1, wherein comparing the first data and the second data includes resolving a logical relationship between positions of a particular element in the XPath expression and a corresponding element in the XML document, wherein the logical relationship includes one relationship from the group consisting of (a) equal to, (b) greater than, (c) less than, (d) greater than or equal to, and (e) less than or equal to.

17. A computer-readable storage medium storing one or more sequences of instructions which, when executed by one or more computer processors, causes the one or more computer processors to perform the method recited in claim 16.

18. The method of claim 1, wherein determining whether an entity is interested in the XML document includes identifying, from an entity-expression association table, one or more entities, from the plurality of entities, that are associated with an XPath expression that matches the XML document.

19. A computer-readable storage medium storing one or more sequences of instructions which, when executed by one or more computer processors, causes the one or more computer processors to perform the method recited in claim 18.

20. The method of claim 1, wherein determining whether an entity is interested in the XML document includes joining a first table in which the first data is stored with a second table in which the second data is stored.

21. A computer-readable storage medium storing one or more sequences of instructions which, when executed by one or more computer processors, causes the one or more computer processors to perform the method recited in claim 20.

22. A system for determining entities that are interested in a particular XML document, the apparatus comprising:
 one or more computer processors;
 means, operatively coupled to the one or more computer processors, for parsing the XML document to obtain levels for elements and values for attributes within the XML document;
 means, operatively coupled to the one or more computer processors, for generating first data that represents the elements and their respective levels and that represents the attributes and their respective values;
 means, operatively coupled to the one or more computer processors, for reading, from one or more data tables, second data that characterizes XPath expressions associated with a plurality of entities; and
 means, operatively coupled to the one or more computer processors, for determining, based at least in part on comparing the first data and the second data, whether an entity of the plurality of entities is interested in the XML document.

23. A computer-readable storage medium storing one or more sequences of instructions which, when executed by one or more computer processors, causes the one or more computer processors to perform the method recited in claim 1.

\* \* \* \* \*

UNITED STATES PATENT AND TRADEMARK OFFICE
CERTIFICATE OF CORRECTION

PATENT NO. : 7,590,650 B2
APPLICATION NO. : 11/441622
DATED : September 15, 2009
INVENTOR(S) : Aravind Yalamanchi It is certified that error appears in the above-identified patent and that said Letters Patent is hereby corrected as shown below:

Title page, item

(*) Notice:   Subject to any disclaimer, the term of this patent is extended or adjusted under 35 U.S.C. 154(b) by 296 days.

Delete the phrase "by 296 days" and insert -- by 408 days --.

In column 10, line 39, after "attributes)" insert -- . --.

Signed and Sealed this

Seventeenth Day of August, 2010

David J. Kappos
*Director of the United States Patent and Trademark Office*